United States Patent
Suntharalingam et al.

(10) Patent No.: US 12,316,091 B2
(45) Date of Patent: May 27, 2025

(54) MODULAR SOLID-STATE CIRCUIT BREAKER

(71) Applicant: Eaton Intelligent Power Limited, Dublin (IE)

(72) Inventors: Piranavan Suntharalingam, Menomonee Falls, WI (US); Armen Baronian, Toronto (CA); Andrew Rockhill, Waukesha, WI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 18/868,622

(22) PCT Filed: May 26, 2023

(86) PCT No.: PCT/EP2023/025249
§ 371 (c)(1),
(2) Date: Nov. 22, 2024

(87) PCT Pub. No.: WO2023/227250
PCT Pub. Date: Nov. 30, 2023

(65) Prior Publication Data
US 2025/0112450 A1    Apr. 3, 2025

Related U.S. Application Data

(60) Provisional application No. 63/346,236, filed on May 26, 2022.

(51) Int. Cl.
*H02H 3/087*    (2006.01)
(52) U.S. Cl.
CPC .................................. *H02H 3/087* (2013.01)

(58) Field of Classification Search
CPC ............................ H02H 3/087; H01H 33/596
See application file for complete search history.

(56) References Cited

U.S. PATENT DOCUMENTS

| | | |
|---|---|---|
| 2017/0117798 A1 | 4/2017 | Basler et al. |
| 2019/0199091 A1* | 6/2019 | Handy ................. H03K 17/162 |

(Continued)

FOREIGN PATENT DOCUMENTS

| | | |
|---|---|---|
| CN | 102290279 A | 12/2011 |
| CN | 207021671 U | 2/2018 |

(Continued)

OTHER PUBLICATIONS

International Search Report and Written Opinion for Application No. PCT/EP2023/025249 mailed Sep. 18, 2023.

(Continued)

*Primary Examiner* — Jared Fureman
*Assistant Examiner* — Christopher J Clark
(74) *Attorney, Agent, or Firm* — Merchant & Gould P.C.

(57) ABSTRACT

A solid-state circuit breaker for a DC system includes a switching module having a first terminal detachably connectable to a DC power source and a second terminal detachably connectable to a load. The switching module has a predetermined plurality of solid-state switches connected in parallel between the first and second terminals. An energy absorbing module has a first terminal detachably connectable to the DC power source and a second terminal detachably connectable to the load. The switching module includes a predetermined plurality of solid-state Transient Voltage Supressors (TVS) connected in parallel between the first and second terminals.

20 Claims, 6 Drawing Sheets

(56) References Cited

U.S. PATENT DOCUMENTS

2020/0062200 A1* 2/2020 Doernbach .......... H03K 17/693
2023/0395876 A1* 12/2023 Hibbard .................. B60L 58/26

FOREIGN PATENT DOCUMENTS

CN 105305372 B 5/2018
EP 3 131 166 B1 2/2019

OTHER PUBLICATIONS

Li et al., "Design of 400 V Miniature DC Solid State Circuit Breaker with SiC MOSFET," Micromachines, 10, 314; doi:10.3390/mi10050314, pp. 1-12 (2019).
Transient Suppression Devices, Power Electronics, https://www.electronics-tutorials.ws/power/transient-suppression.html, 12 pages (Publicly known at least as early as Jun. 11, 2020).

* cited by examiner

MODULAR SOLID-STATE CIRCUIT BREAKER

CROSS REFERENCE TO RELATED APPLICATIONS

This application is a National Stage Application of PCT/EP2023/025249, filed on May 26, 2023, which claims the benefit of U.S. Patent Application Ser. No. 63/346,236, filed on May 26, 2022, the disclosures of which are incorporated herein by reference in their entireties. To the extent appropriate, a claim of priority is made to each of the above disclosed applications.

BACKGROUND

A circuit breaker is an electrical safety device designed to protect an electrical circuit from damage caused by an overcurrent or short circuit. It interrupts current flow to protect equipment and prevent risk of injury or fire. Electromechanical circuit breakers use a mechanical contactor to make and break the circuit between a line side and a load side. When broken by a mechanical contactor, there is a physical separation of the conductive path between the line side and the load side. The physical separation is between contacts of the mechanical contactor and occurs within a medium, such as air, for example, or another dielectric material.

DC systems are gaining interest due to their power transferring efficiency. An increasing trend on DC system research for automotive, aerospace, and microgrid applications can be observed in recent years. However, designing protecting system for DC systems is challenging compared to an AC system form short circuit condition. A solid-state circuit breaker (SSCB) replaces moving parts of an electromechanical circuit breaker with semiconductor switches and software that can interrupt currents faster. SSCBs are gaining interest in protecting high power DC system form short circuit conditions. During a short circuit event in a DC system, circuit current can triple from its nominal magnitude. Hence, short circuit interruption should happen extremely fast to protect undamaged components in the circuitry and to avoid further accidents. Regardless of the speed of shutting down the circuit, the energy stored in the circuit inductor should be dissipated to stabilize the system. However, solid-state switches of typical SSCBs do not provide the isolation provided by mechanical contactors of electromechanical circuit breakers.

SUMMARY

In accordance with some aspects of the present disclosure, a solid-state circuit breaker for a DC system includes a switching module having a first terminal detachably connectable to a DC power source, and a second terminal detachably connectable to a load. The switching module includes a predetermined plurality of solid-state switches connected in parallel between the first and second terminals. Further, an energy absorbing module has a first terminal detachably connectable to the DC power source and a second terminal detachably connectable to the load. The switching module including a predetermined plurality of solid-state Transient Voltage Supressors (TVS) connected in parallel between the first and second terminals.

In accordance with further aspects of the disclosure a DC system includes a DC power source and a load connected to receive DC power from the DC power source. A solid-state circuit breaker includes a switching module having a predetermined plurality of solid-state switches connected in parallel between a first terminal and a second terminal. Solid-state circuit breaker further includes an energy absorbing module having a predetermined plurality of solid-state Transient Voltage Supressors (TVS) connected in parallel between the first and second terminals. A first connector detachably connects the first terminal to the DC power source, and a second connector detachably connects the second terminal to the load.

In accordance with additional aspects of the disclosure, a solid-state circuit breaker method includes providing a DC system including a load configured to be powered by the DC power source. System inductance for the DC system is determined, and based thereon a number of solid-state Transient Voltage Supressors (TVS) to absorb energy stored by the DC system in response to the short-circuit event is determined. An energy absorbing module that includes the determined number of TVSs and a switching module are detachably connected between the DC power source and the load. The switching module is responsive to a short-circuit event of the DC system.

DETAILED DESCRIPTION

Figure 1:
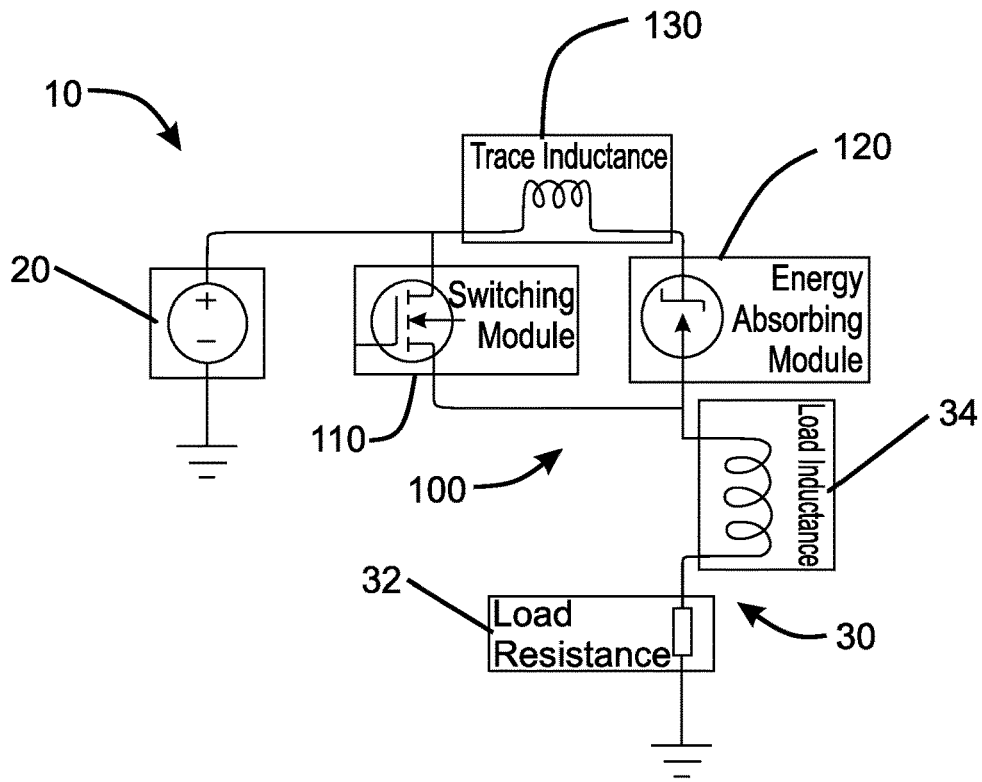
FIG. 1 is a circuit diagram illustrating an example of a DC system including a modular solid-state circuit breaker in accordance with aspects of the present disclosure.

In the following Detailed Description, reference is made to the accompanying drawings, which form a part hereof, and in which is shown by way of illustration specific embodiments in which the invention may be practiced. In this regard, directional terminology, such as top, bottom, front, back, etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense.

A circuit breaker is an electrical safety device designed to protect an electrical circuit from damage caused by an overcurrent or short circuit. It interrupts current flow to protect equipment and prevent risk of injury or fire. A solid-state circuit breaker (SSCB) replaces moving parts of an electromechanical circuit breaker with semiconductor switches and software that can interrupt currents faster. Because there are no electric arcs within the circuit breaker, external circuit elements are used to dissipate the stored energy in circuit inductance.

DC systems are gaining interest due to their power transferring efficiency. An increasing trend on DC system research for automotive, aerospace, and microgrid applications can be observed in recent years. However, designing protecting system for DC system can challenging compared to an AC system, since there is no zero-crossing for the current in DC systems.

In DC systems, SSCBs thus function, among other things, to quickly detect a short circuit condition, limit state loss, provide fast circuit interruption to disconnect the short circuit form the main system, absorb the stored energy in the DC system during transient and protect itself.

Disclosed SSCBs include a switch to interrupt the current flow path during a short circuit condition, and an energy absorbing device to absorb the stored energy in the DC system. SSCBs use semiconductor switches such as metal-oxide semiconductor field-effect transistors (MOSFET), insulated-gate bipolar transistors (IGBT), etc. as the circuit breaker's switch, and a solid state energy absorbing devices such Transient Voltage Suppressors (TVS), Metal Oxide Varistors (MOV), Zener diodes, etc.

The solid-state switch is sized to achieve low conducting loss and high reverse-biased blocking voltage. During a short circuit interruption, the solid-state switch is configured to turn off in response to a short circuit event, and the current flowing through the switch is diverted via another channel. Otherwise, the voltage across the switch could lead to damage of the device itself. The energy absorbing device (e.g. TVS) functions to provide over-voltage protection by clamping the voltage across the switch to be lower than its peak reverse-biased blocking voltage. Since the switch will not conduct during the short circuit interruption, all the current stored in the system's inductance will be diverted via the energy absorbing device until all the stored energy in the system is dissipated. Hence, the energy absorbing device should be sized to handle the stored energy in the system (primarily the energy stored in the system inductance). The system inductance may vary widely depending upon the power system architecture (i.e. higher system inductance needs bigger energy absorbing device and vice versa), making it difficult to predict. Thus, designing a high power dense SSCB for a wide range of power systems is difficult.

In accordance with aspects of this disclosure, a SSCB is provided that uses a modular concept to achieve optimum power density for various DC power systems. Some examples of the disclosed SSCB include two different modules, including a switching module and an energy absorbing module. Depending upon the system inductance, different energy absorbing modules may be connected to the switching module to provide the desired power density.

FIG. 1 is a block diagram conceptually illustrating an example of a DC system 10 employing a modular SSCB system 100 in accordance with the present disclosure. The DC system 10 includes a DC power source 20 and a load 30. The load 30 includes load resistance 32 and load inductance 34 components. The SSCB 100 includes a switching module 110 and an energy absorbing module 120. The switching module 110 and energy absorbing module 120 are connected in parallel between the DC source 20 and the load 30. As will be discussed further below, in some examples, the switching module 110 includes a plurality of solid-state switches, such as MOSFET switches, and the energy absorbing module includes a plurality of TSVs.

Figure 2:
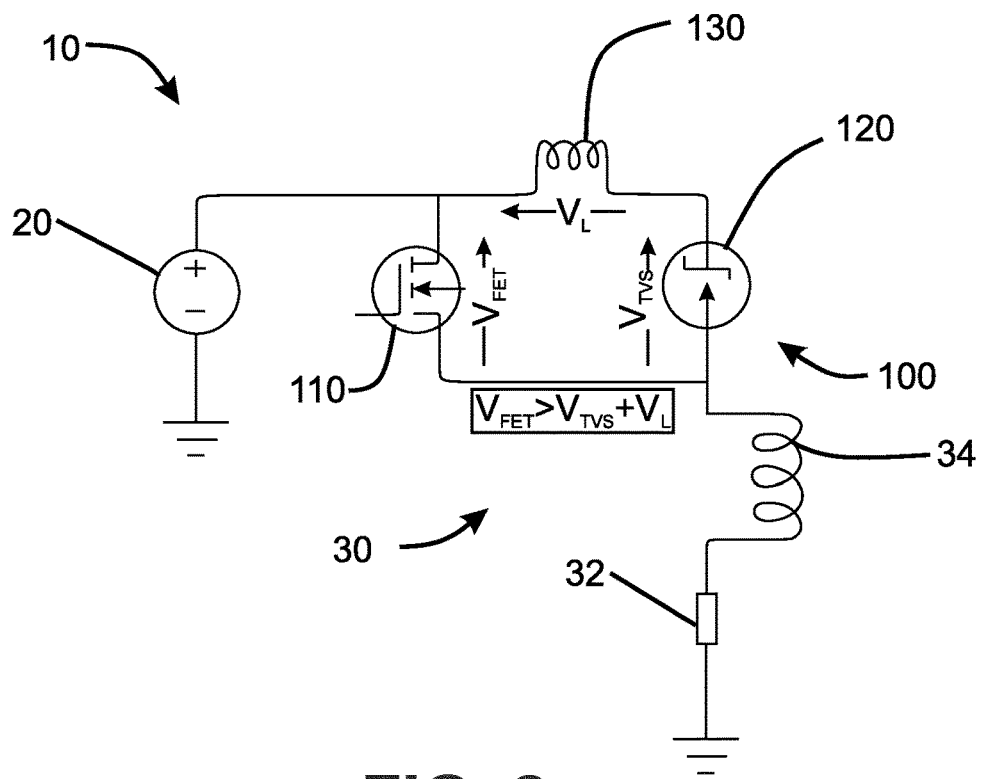
FIG. 2 is a circuit diagram illustrating examples of voltage constraints for the system shown in FIG. 1.

As noted above, depending on the make up of the particular DC system 10, the load resistance 32 and load inductance 34 components of the load 30 can vary. Depending on the DC system 10, particular desired switching speeds for reacting to a short-circuit event may vary. Further, the energy stored by the load inductance component 34 can vary, making it desirable to match the energy absorbing capabilities of the SSCB 100 in accordance with the load inductance number 34. FIG. 2 illustrates examples of voltage constraints for the components of the SSCB 100, where the switch voltage $V_{FET}$ is greater than the combined TVS voltage $V_{TVS}$ and inductor voltage $V_L$ (i.e. $V_{FET} > V_{TVS} + V_L$).

Figure 3:
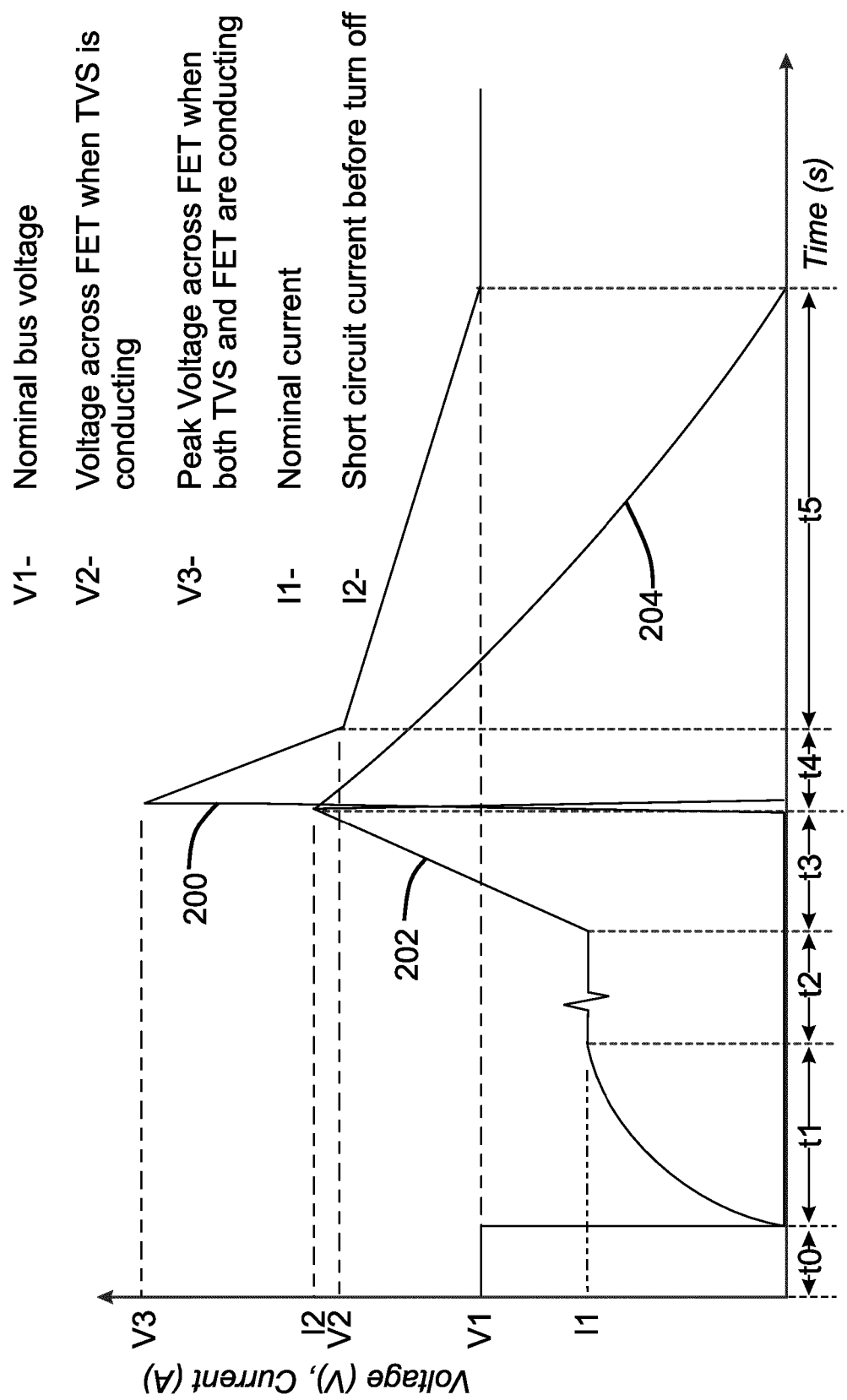
FIG. 3 is a chart illustrating examples of voltage and current waveforms for example DC system in accordance with aspects of the present disclosure.

FIG. 3 illustrates example surge voltage 200 and current 202 waveforms with respect to time, where V1 is the nominal bus voltage, V2 is the voltage across the switching module 110 when the energy absorbing module 120 is conducting, V3 is the peak voltage across the switching module 110 when both the energy absorbing module 120 and switching module 110 are conducting, I1 is the nominal current, and I2 is the short circuit current before turn off. FIG. 3 illustrates the voltage waveform 200 at the nominal bus voltage level V1 during time period t0. At the end of time period to the voltage 200 sharply falls and during time period t1, and the current 202 increases such as in response to a short circuit event. The short circuit is detected and the switching module 110 is controlled accordingly. The current 202 continues to rise during time period t3 until it reaches the I2 level. At the end of the t3 time period, the SSCB 100 is activated and the switching module 110 turns off. After rising to the peak voltage level V3 (i.e. both the switching module 110 and energy absorbing module 120 conducting), the voltage 200 and current 204 falls during time period t4 to the V2 level (energy absorbing module 120 conducting), and during time period t5 the voltage 200 continues to drop as the energy in the system inductance 34 is absorbed by the energy absorbing module 120.

Figure 5:
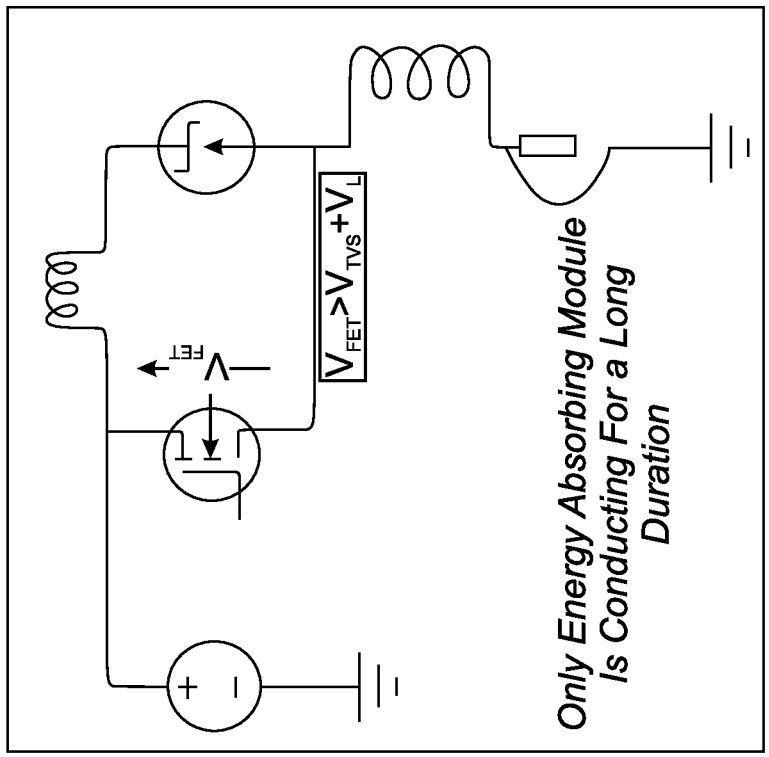
FIG. 5 is a circuit diagram illustrating additional aspects of the solid-state circuit breaker shown in FIG. 1.
Figure 4:
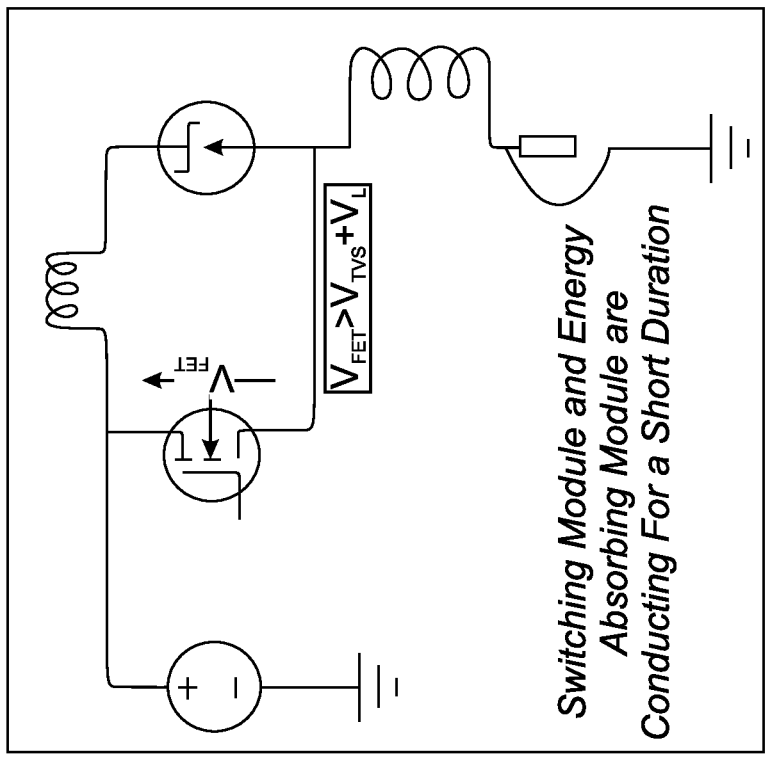
FIG. 4 is a circuit diagram illustrating further aspects of the solid-state circuit breaker shown in FIG. 1.

As shown in FIG. 4, the switching module 110 and energy absorbing module 120 both conduct for only a short time at the beginning of time period t4, while the bus voltage $V_{BUS}$ is greater than the voltage $V_{FET}$ across the switching module 110. As shown in FIG. 5, the energy absorbing module 120 alone conducts for a longer period of time, while the switching module voltage voltage $V_{FET}$ is greater than the bus voltage $V_{BUS}$, which is greater than the combined voltages across the energy absorbing module 120 and the inductor voltage $V_L$.

Figure 6:
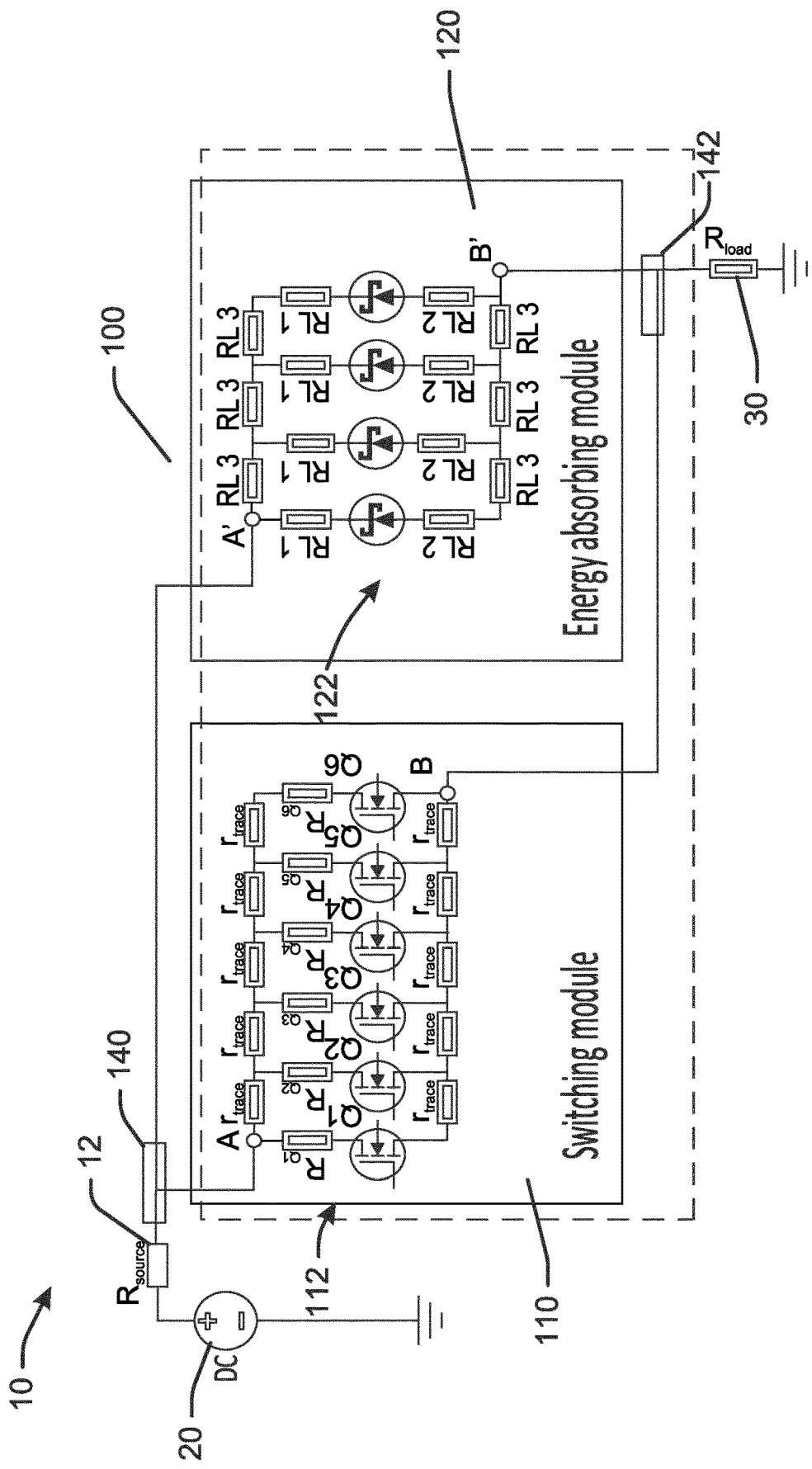
FIG. 6 is a circuit diagram illustrating another example of a modular solid-state circuit breaker system in accordance with aspects of the present disclosure.

FIG. 6 illustrates an example of the modular SSCB system 100. The SSCB system 100 is connected between the DC power source 20 and the load 30 of the DC system 10. The switching module 110 of the modular SSCB system has a first terminal A detachably connectable to the DC power source 20. In FIG. 6, the first terminal A is connected to a resistance component I2 of the DC power source 20. A second terminal B of the switching module 110 is connectable to the load 30. The switching module 110 has a predetermined plurality of solid-state switches 112 connected in parallel between the first terminal A and the second terminal B. In the illustrated example, the plurality of switches 112 includes six MOSFET switches Q1-Q6 connected in parallel between the first terminal A and the second terminal B. The disclosure is not limited to switching modules 110 employing MOSFET switches. Other types of solid-state switches are within the scope of the disclosure, such as IGBT switches.

Various parameters (e.g. the number and size of the switches 112) of the switching module 110 may be determined based on aspects of the DC system 10, such as the desired conducting speed, the desired conducting loss of the switches, desired reverse-biased blocking voltage, the system resistance, the system inductance (the various resisters shown in FIG. 6 represent various resistive and inductive impedances of system components), etc. Gate terminals of the MOSFET switches Q1-Q6 may be connected to a circuit configured to detect a short-circuit of the DC system 10, for example, such that the MOSFET switches Q1-Q6 are operated in response to detection of such a short-circuit event to disconnect the load 30 from the DC power source 20.

The energy absorbing module 120 has a first terminal A' detachably connectable to the DC power source 20 and a second terminal connectable to the load 30. Similarly to the switching module 110, the first terminal A' of the energy absorbing module 120 is connected to the resistance component 12 of the DC power source 20. A second terminal B' of the energy absorbing module 120 is connectable to the load 30. The energy absorbing module 120 has a predetermined plurality of TVSs 122 connected in parallel between the first terminal A' and the second terminal B' of the energy absorbing module 120. In the illustrated example, the plurality of TVSs 122 includes four TVSs connected in parallel between the first terminal A' and the second terminal B'. Various parameters (e.g. the number and size of the TVSs) of the energy absorbing module 120 may be determined based on aspects of the DC system 10, such as the desired switching speed, the system resistance, the system inductance, etc.

A first connector 140 is configured to mechanically and electrically connect the first terminals A and A' of the respective switching module 110 and the energy absorbing module 120 to the DC power source 20. Similarly, a second connector 142 is configured to mechanically and electrically connect the second terminals B and B' of the respective switching module 110 and the energy absorbing module 120 to the load 30. This facilitates connecting, for example, a different version of the switching module 110 and/or the energy absorbing module 120 between the DC power source 20 and the load 30. For instance, if it is determined that the overall system inductance requires additional of the TVSs 122 to absorb the energy stored in the load inductance, and alternative energy absorbing module 120 that has additional TVSs 122 could replace the illustrated energy absorbing module 120 that has four TVSs 122. If a different switching speed for the switching module 110 is desired, an alternative switching module 110 having more or fewer of the MOSFET switches 112 could replace the switching module 110 shown in FIG. 6.

Figure 7:
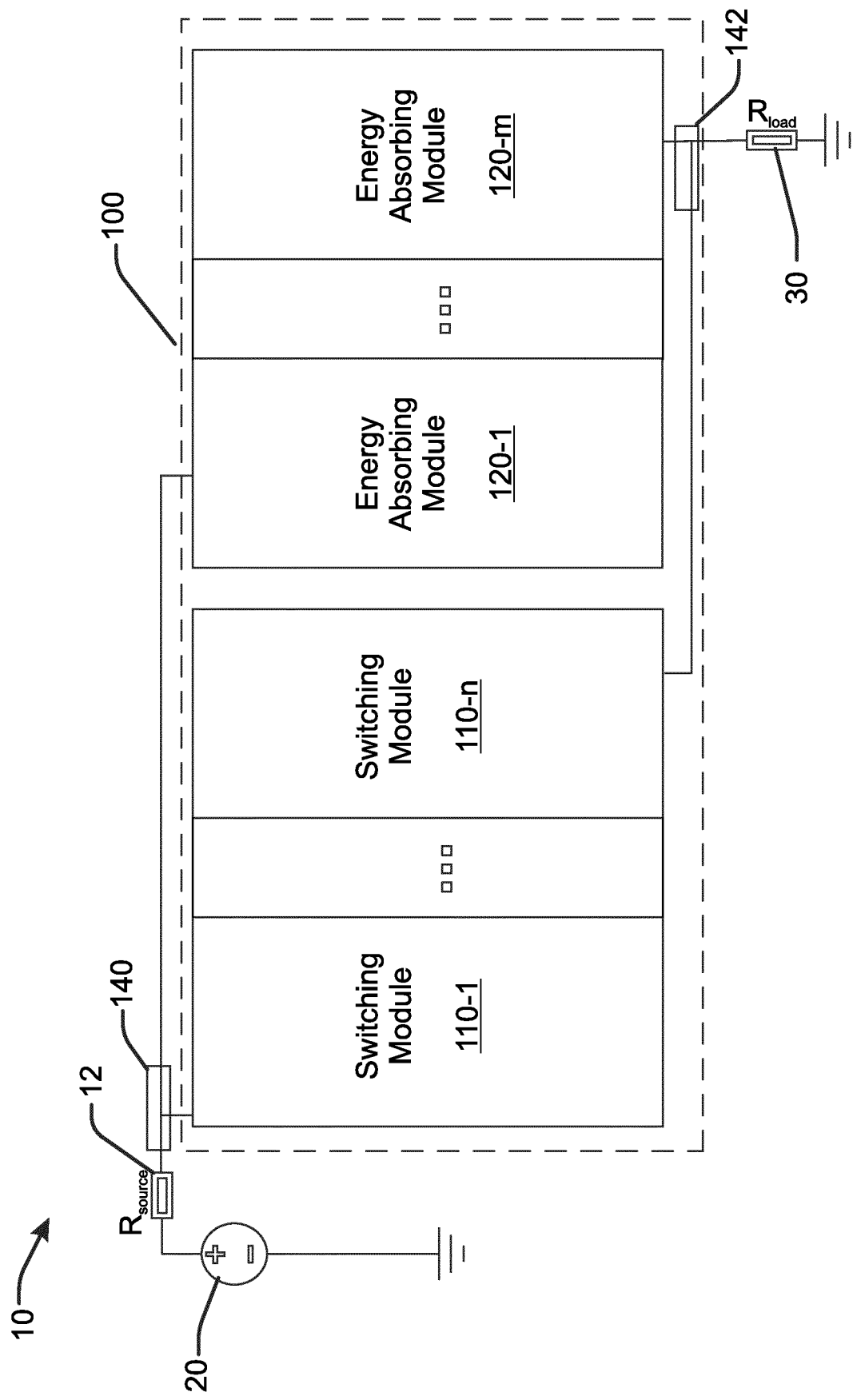
FIG. 7 is a circuit diagram illustrating a further example of a modular solid state circuit breaker system in accordance with aspects of the present disclosure.

FIG. 7 illustrates another example in which multiple switching modules 110 and/or energy absorbing modules 120 are connected between the DC power source 20 and the load 30. In the example shown in FIG. 7, there are n switching modules 110-1 . . . 110-n and m energy absorbing modules 120-1 . . . 120-n connected between the DC power source 20 and the load 30 (m and n are positive integers greater than 1).

Each of the switching modules 110-1 . . . 110-n could be identical to one another (i.e. each having six of the MOSFET switches 112 as shown in the example of FIG. 6. Alternatively, in other examples, the switching modules 110-1 . . . 110-n could have differing configurations. For example, one or more of the switching modules 110 could have six MOSFET switches 112 as shown in FIG. 6, while other of the switching modules 110 could have more or fewer switches 112. The number of switching modules 110 and their configuration(s) could vary based on parameters of the DC system 10 and desired operational parameters of the switching module 110 (i.e. switching speed).

Similarly, each of the energy absorbing modules 120-1 . . . 120-n could be identical to one another (i.e. each having four of the TVSs 122 as shown in the example of FIG. 6. Alternatively, in other examples, the energy absorbing modules 120-1 . . . 120-n could have differing configurations. For example, one or more of the energy absorbing modules 120 could have four TVSs 122 as shown in FIG. 6, while other of the energy absorbing modules 120 could have more or TVSs 122. The number of energy absorbing modules 120 and their configuration(s) could vary based on parameters of the DC system 10 and desired operational parameters of the energy absorbing module 120 (i.e. load inductance 34).

In some examples, the switching modules 110 and the energy absorbing modules 120 include connectors that facilitate connecting one module 110, 112 to another. The interconnected modules 110, 120 are then connectable between the DC power source 20 and the load 30 by the respective connectors 140 and 142. In other embodiments, the connectors 140 and 142 are configured such that multiple of the switching modules 110 and/or energy absorbing modules 120 are able to connect the terminals A,A',B,B' to the DC power source 20 and load 30.

As noted above, the switching module(s) 110 an energy absorbing module(s) 120 are not limited to the specific configurations shown, for example, in FIG. 6. Switching modules 110 having other than six switches 112 and energy absorbing modules 120 having other than for TVSs are within the scope of the disclosure. In one example for a DC system with a 0.75 ms time constant, switching module(s) 110 having a total of two MOSFET switches 112 are combined with energy absorbing module(s) 120 having a total of three TVSs such that the TVSs 122 absorb 27J in response to a simulated short-circuit. In another example for a DC system with a 0.25 ms time constant, switching module(s) 110 having a total of two MOSFET switches 112 are combined with an energy absorbing module 120 having one TVS absorbs 27J in response to a simulated short-circuit.

Figure 8:
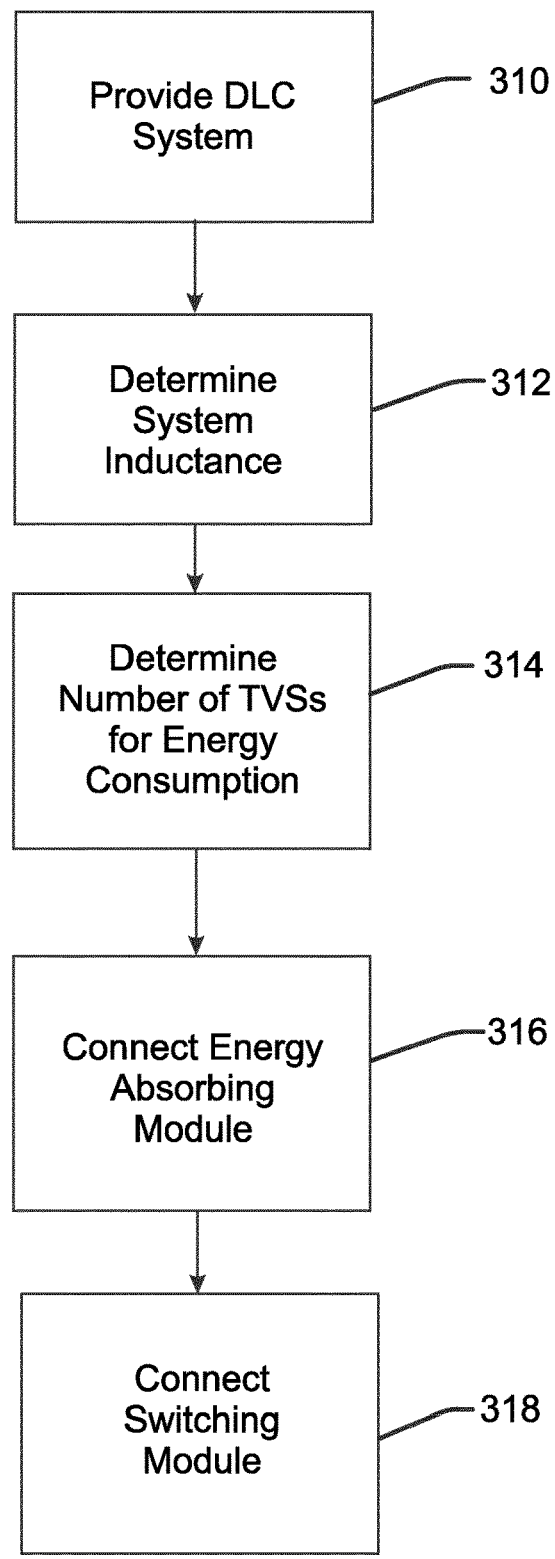
FIG. 8 is a flow diagram illustrating an example of a circuit breaker method in accordance with aspects of the present disclosure.

FIG. 8 is a flow diagram illustrating an example of a solid-state circuit breaker method 300 in accordance with aspects of the disclosure. In block 310, a DC system is provided. As noted above, designing short-circuit protection for DC systems can be difficult as compared to an AC system, since a DC system does not include a zero-crossing condition. Examples of the SSCB system 100 discussed herein use solid-state switches (e.g. MOSFETs or IGBTs) to provide low on state loss while providing fast switching speed upon detection of a short circuit, thus facilitating fast circuit interruption to disconnect the short circuit form the DC system. Further, disclosed examples of the SSCB system 100 are configured to absorb the stored energy in the DC system 10 during transients and protect the SSCB itself.

Thus, examples of the disclosed switching module 110 may be configured (i.e. sized) to achieve low conducting loss and high reverse-biased blocking voltage in the event of a short-circuit event. During a short circuit interruption, current flowing through the switching module 110 is diverted via another channel, i.e. the energy absorbing module 120 prevent the voltage across the switching module 110 from exceeding and potentially damaging the switching module itself. The energy absorbing module 120 is configured to provide over voltage protection by clamping the voltage across the switching module 110 to be lower than its peak reverse-biased blocking voltage.

However, since the switching module 110 does not conduct during the short-circuit event, the current is diverted via the energy absorbing module until all the stored energy in the system is dissipated. Hence the energy absorbing device should be sized to handle the stored energy in the system (primarily the energy stored in the system inductance). However, depending on the power system architecture of the DC system, the amount of energy absorption capacity required may vary.

Therefore, in accordance with aspects of the disclosure, a modular SSCB system 100 is provided to provide flexible SSCB parameters based on the DC system in which it is employed. Thus, in block 312, the induction of the DC system is determined. Based on the induction of the DC system determined in block 312, in block 314 a number of solid-state Transient Voltage Supressors (TVS) to absorb energy stored by the DC system in response to a short-circuit event is determined. In block 316 an energy absorbing module 120 that includes the number of TVSs determined in block 314 is detachably connected between the DC power source and the load. A switching module 110 is detachably connected between the DC power source and the load in block 318. As discussed above, the switching module 110, which includes a plurality of solid-state switches, is operated in response to detection of the short circuit event to disconnect the load from the DC power source.

The disclosed SSCB 100 thus provides a modular system which can be effectively used to achieve optimum power density for various DC power systems. The SSCB system includes two different modules, the switching module 110 and the energy absorbing module 120. Depending upon the system inductance, different energy absorbing modules 120 are connected with the switching module 110.

The foregoing outlines features of example embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A solid-state circuit breaker for a DC system, comprising:
   a switching module having a first terminal detachably connectable to a DC power source and a second terminal detachably connectable to a load, the switching module including a predetermined plurality of solid-state switches connected in parallel between the first and second terminals; and
   an energy absorbing module having an other first terminal detachably connectable to the DC power source and an other second terminal detachably connectable to the load, the energy absorbing module including a predetermined plurality of solid-state Transient Voltage Supressors (TVS) connected in parallel between the other first and second terminals.

2. The solid-state circuit breaker of claim 1, wherein the plurality of solid-state switches includes MOSFET switches.

3. The solid-state circuit breaker of claim 1, wherein the plurality of solid-state switches includes IGBT switches.

4. The solid-state circuit breaker of claim 1, wherein the plurality of solid-state switches includes a number of the solid-state switches based on a predetermined parameter of the DC system.

5. The solid-state circuit breaker of claim 4, wherein the predetermined parameter of the DC system includes a desired switching speed for the solid-state circuit breaker.

6. The solid-state circuit breaker of claim 1, wherein the plurality of TVSs includes a number of the TVSs based on a predetermined parameter of the DC system.

7. The solid-state circuit breaker of claim 6, wherein the predetermined parameter of the DC system includes inductance of the DC system.

8. The solid-state circuit breaker of claim 1, further comprising a first connector configured to mechanically and electrically connect the first terminal of the switching module to the DC power source, and a second connector configured to mechanically and electrically connect the second terminal of the switching module to the load.

9. The solid-state circuit breaker of claim 8, wherein the first connector is configured to mechanically and electrically connect the first terminal of a plurality of the switching modules to the DC power source, and the second connector is configured to mechanically and electrically connect the second terminal of a plurality of the switching modules to the load.

10. The solid-state circuit breaker of claim 8, wherein the first connector is configured to mechanically and electrically connect the other first terminal of the energy absorbing module to the DC power source, and the second connector is configured to mechanically and electrically connect the other second terminal of the energy absorbing module to the load.

11. The solid-state circuit breaker of claim 10, wherein the first connector is configured to mechanically and electrically connect the other first terminal of a plurality of the energy absorbing modules to the DC power source, and the second connector is configured to mechanically and electrically connect the second other terminal of a plurality of the energy absorbings module to the load.

12. The solid-state circuit breaker of claim 1, further comprising a plurality of switching modules including the switching module.

13. The solid-state circuit breaker of claim 12, wherein the plurality of switching modules are detachably connectable to one another.

14. The solid-state circuit breaker of claim 1, further comprising a plurality of energy absorbing modules including the energy absorbing module.

15. The solid-state circuit breaker of claim 14, wherein the plurality of energy absorbing modules are detachably connectable to one another.

16. A DC system, comprising:
   a DC power source;
   a load connected to receive DC power from the DC power source;
   a solid-state circuit breaker including:
      a switching module including a predetermined plurality of solid-state switches connected in parallel between a first terminal and a second terminal; and
      an energy absorbing module including a predetermined plurality of solid-state Transient Voltage Supressors (TVS) connected in parallel between an other first terminal and an other second terminal;

a first connector detachably connecting the first terminal and the other first terminal to the DC power source; and a second connector detachably connecting the second terminal and the other second terminal to the load.

17. The DC system of claim 16, wherein the solid-state circuit breaker includes a plurality of switching modules including the switching module.

18. The DC system of claim 16, wherein the solid-state circuit breaker includes a plurality of energy absorbing modules including the energy absorbing module.

19. A method, comprising:

providing a DC system including a load configured to be powered by the DC power source;

determining a system inductance for the DC system;

determining a number of solid-state Transient Voltage Supressors (TVS) to absorb energy stored by the DC system in response to the short-circuit event based on the determined system inductance;

detachably connecting an energy absorbing module including the determined number of TVSs connected in parallel between a first terminal and a second terminal between the DC power source and the load; and detachably connecting a switching module having an another first terminal and an another second terminal between the DC power source and the load via the another first and second terminals wherein the switching module is responsive to a short-circuit event of the DC system.

20. The method of claim 19, further comprising determining a number of solid-state switches to be included in the switching module.

* * * * *